Feb. 13, 1940.                H. E. JORDAN                2,190,027
                          LIQUID DETECTING DEVICE
                            Filed Feb. 11, 1939
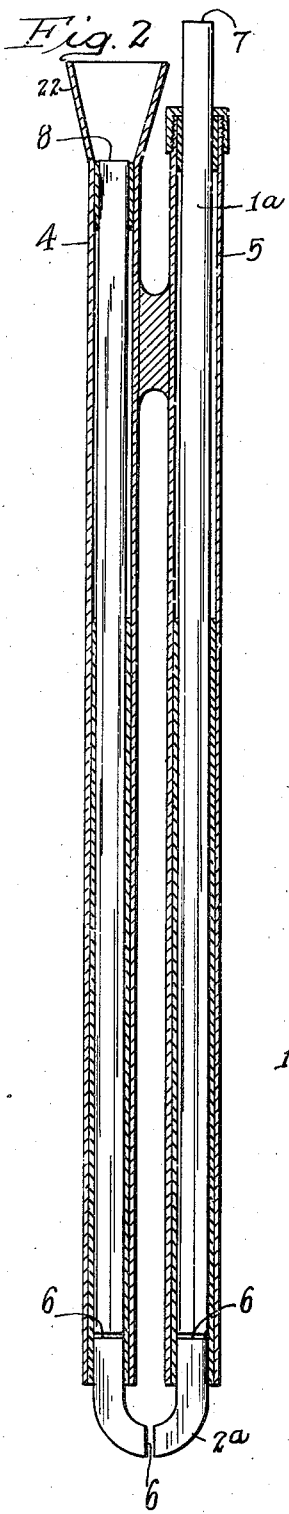
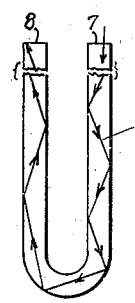
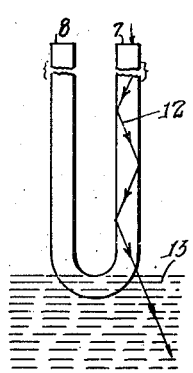
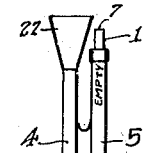
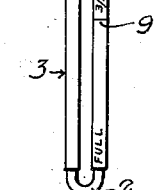
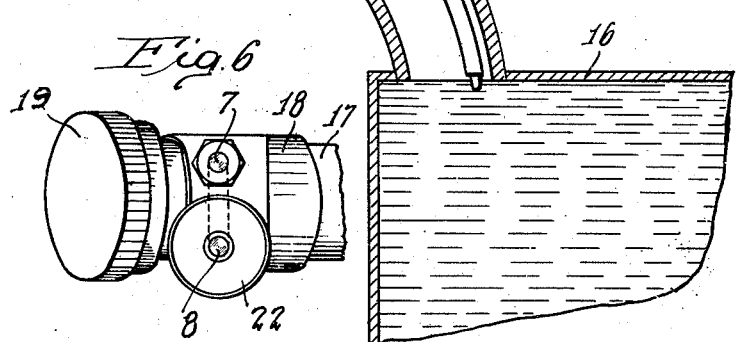
Inventor
Henry Ewin Jordan
By Lyon & Lyon
Attorneys Patented Feb. 13, 1940

2,190,027

UNITED STATES PATENT OFFICE 2,190,027

LIQUID DETECTING DEVICE

Henry Ewin Jordan, Los Angeles, Calif.

Application February 11, 1939, Serial No. 255,896

8 Claims. (Cl. 116—118)

This invention relates broadly to liquid detecting devices, and is particularly useful in apparatus for determining whether or not liquid is present in a predetermined location, although the invention may be employed in gauges for determining what the level of liquid is with respect to a reference standard.

A general object of the invention is to provide a liquid detecting device that is simple, reliable, has no moving parts, and may be installed in containers, tanks, pipes, and the like, without danger of causing leakage or introducing a fire hazard in the case of imflammable liquids or gases.

I accomplish the foregoing objects in accordance with the present invention by utilizing a rod of transparent material which is exposed at a point intermediate its ends to the medium to be investigated, in combination with means for transmitting light longitudinally through the rod and determining variations in the amount of light transmitted from one end of the rod to the other.

It is well known that a rod of transparent material having an index of refraction of substantial magnitude will ordinarily transmit a substantial amount of light from one end to the other, even though the rod may be bent. The reason for this is that light seeking to escape through the lateral surface of the rod is totally reflected back into the rod unless the angle of incidence of the light at the surface of the rod is relatively small. (The angle of incidence being the angle between the ray of light and a line drawn normal to the reflecting surface at the point of incidence.) The angle of incidence above which all light is totally reflected, is known as the critical angle and varies with the index of refraction of the material. For ordinary glass, it is in the neighborhood of 40°. Therefore when a rod of glass is positioned in air or other gas and light is directed into one end of the rod, most of the light entering the rod will follow it to the opposite end and there emerge because most of the light will enter the rod at an angle less than 50° to the lateral surface of the rod, and will be totally reflected at a low angle from different points on the lateral surface of the rod until it reaches the opposite end. However, if a portion of the rod intermediate the end is immersed in a liquid having an index of refraction of the same order of magnitude as the rod material, then the rod substantially completely loses its internal reflecting properties, permitting much of the light to escape from the rod into the liquid, thereby greatly reducing the total amount of light transmitted to the remote end of the rod and substantially reducing the intensity of the transmitted light at the remote end.

I have discovered that by immersing a portion, even a small portion, of the lateral surface of such a rod in liquid, the diminution in the intensity of illumination of the remote end of the tube is readily observable.

A full understanding of the invention and some specific applications thereof, may be had from the following detailed description, which refers to the drawing.

In the drawing:

Fig. 1 is a side elevation view of a simple portable liquid gauge, in accordance with my invention;

Fig. 2 is a longitudinal sectional view through a slightly modified gauge;

Fig. 3 is a schematic diagram illustrating the transmission of light by internal reflection through a transparent rod surrounded by air;

Fig. 4 is a schematic diagram illustrating the loss of light from such a rod when immersed in liquid;

Fig. 5 is a sectional view showing a gauge in accordance with the invention, installed on a gasoline tank for indicating when the tank is full; and Fig. 6 is a plan view of the outer portion of the spout and related apparatus of Fig. 5.

The gauge disclosed in Fig. 1 comprises a relatively elongated rod 1 of transparent material having a reverse bend 2 substantially at the middle thereof and mounted in a metal frame 3 for safety. The frame 3 consists of two tubular members 4 and 5, respectively, which enclose the greater portion of the straight lengths of the rod 1. The specific construction is better disclosed in Fig. 2, showing a gauge identical in all respects with that shown in Fig. 1, except that the rod is formed in a plurality of pieces instead of one piece. The corresponding parts of Fig. 2 bear the same reference numerals as Fig. 1 with the suffix a. As has been indicated, the device shown in Fig. 2 has the rod 1a formed in four sections with a short gap intermediate the sections. There is no advantage, from the standpoint of efficiency of operation, in having the gap 6, but it may have advantages in manufacture and is disclosed as a possible variation of the structure shown in Fig. 1 for that reason. As shown in both Figs. 1 and 2, one end of the rod 1 or 1a projects beyond the end of the enclosing protecting tube 5 so that it is exposed to light. The other end of the rod 1a terminates within the end of its enclosing tube 4 and the latter is flared out, funnel shape, at the upper end, and is preferably coated on its inside surface with dark paint to in part protect the adjacent end of the rod from external illumination. For convenience the exposed end of the tube may be identified with the reference numeral 7 and the protected end by the reference numeral 8.

One or both of the enclosing tubes 4 and 5 may bear gradations 9, indicating the distance from the lower end of the device. The gauge described with reference to Figs. 1 and 2 is intended to be lowered into a tank or receptacle of any kind to determine the position of the liquid level therein. The operator lowers the device while observing the end 8 of the rod 1 or 1a, as the case may be. Prior to immersion in the liquid, the end 8 appears brightly illuminated by light impinging on the end 7 and conducted longitudinally through the rod. However, as soon as the lowermost portion of the rod contacts liquid, the illumination of the end 8 is very markedly decreased, indicating to the operator that the lower end of the gauge has contacted the liquid. By then observing the gradations 9 with reference to the top of the tank or any other desired reference standard, the position of the liquid level is ascertained.

To check the results, the operator may lift the gauge slightly to carry the rod clear of the liquid; this immediately results in increase of the intensity of the illumination of the end 8 to its former value despite the fact that more or less of the liquid may adhere to the surface of the rod.

The operation described may be carried on without any special illumination other than what may be present from daylight or the usual artificial illumination. Of course, if desired, a more intense illumination of the end 8 with a correspondingly more marked decrease of such illumination when the lower end of the rod is immersed in the liquid, may be obtained by holding a lamp closely adjacent the end 7 of the rod. It is within the scope of the invention to provide, if desired, a special lamp, such as a small electric bulb, immediately above the end 7 of the rod to produce an intense local illumination.

The theory of operation of the gauge as described, may be readily understood from reference to Figs. 3 and 4, which show what happens to a random ray of light transmitted down through the rod from the end 7. It will be observed that in Fig. 3, showing the case in which the rod is not immersed in liquid, the ray of light 12 travels obliquely at a low angle from one lateral wall of the rod to the other, being completely reflected at each point of contact by virtue of the difference in the refractive powers of the rod material and of the air surrounding it. In Fig. 4, however, the ray 12, after contacting the lateral wall in three places and being totally reflected each time, next reaches the outer surface of the rod at a point where the latter is in contact with liquid 13, it being assumed, in this particular instance, that the liquid 13 has the same refractive index as the material of the rod, under which conditions the light ray 12 is neither reflected nor refracted at the surface of the rod but continues in a straight line therethrough into the liquid.

Of course ordinarily the liquid tested would not have exactly the same index of refraction as the rod material and there would usually be some refraction of the ray 12 at the point of emergence from the rod. Furthermore, if the rod material has a much greater index of refraction than the liquid, then rays of light striking the liquid-rod contact surface at a very low angle, might still be internally reflected back into the rod. However, even with a substantial discrepancy between the indexes of refraction of the rod and the liquid, respectively, there will be a substantial diminution in the total number of rays totally reflected, with corresponding reduction in intensity of illumination at the end 8.

A particularly useful form of the invention is disclosed in Figs. 5 and 6 in which a gauge in accordance with the invention is mounted in the filler spout 15 of the gasoline tank 16 of an automobile. As is well known, most modern automobiles have fuel tanks mounted well within the sheet metal body of the automobile, necessitating relatively long filler pipes leading to the exterior of the body. Furthermore these filler pipes or spouts are often curved or bent. As a result, it is impossible for a service station attendant filling the tank to see into the tank and determine by direct observation when it is full. Therefore, if the operator desires the tank filled to capacity, it is common for the service station attendant to continue feeding gasoline into the spout until it overflows, with resulting fire hazard and damage to the exterior surfaces of the automobile.

I am aware that gauges are provided on the instrument boards of modern automobiles which are intended to indicate when a tank is filled, but these gauges are usually too inaccurate to be relied upon to determine when the tank is exactly full. Even if such gauges were sufficiently reliable, they are usually out of sight of the attendant, who is filling the tank, and it is highly desirable to have an accurate and reliable gauge positioned adjacent the filler spout to indicate to the attendant exactly when the tank is filled.

As shown in Figs. 5 and 6, a gauge 17 of the general type described in connection with Figs. 1 and 2, is incorporated in the spout 15 with its lower end positioned at the juncture of the spout with the tank. As shown in Fig. 5, the rods and tubes of the gauge 17 are bent to conform to the curvature of the filler spout 15 so that they will lie close along the side thereof and not interfere with the insertion of a gasoline nozzle into the spout. Various methods may be employed for anchoring the gauge in position. I have shown in Fig. 5 an attachment that may be secured to existing tank spouts 15. Thus I have provided an extension nipple 18 having threads at its lower end adapted to screw onto the filler spout 15 in place of the usual screw cap 19, but having threads on its outer end to receive the cap 19. This nipple 18 is provided with apertures in its side wall through which the tubes of the gauge 17 project to the exterior. To anchor the tubes of the gauge to the nipple, the tubes may be threaded to receive nuts 20 and 21 on the interior and exterior sides of the nipple, respectively. Furthermore, the funnel or light shield 22 may also be threaded onto the tube associated with the end 8 of the light-conducting rod, and suitable washers 23 may be provided to make a fluid-tight connection.

The operation of the gauge shown in Figs. 5 and 6 will be obvious. The service station attendant simply observes the end 8 of the transparent rod while he is filling the tank, and is immediately informed when the liquid level rises to the top of the tank by the dimming of the end 8 of the rod.

The transparent rod employed in my invention may be made of many different materials, including various types of glass, quartz, and some of the newer plastic materials, an example of which is sold under the trade name of "Leucite". It is desirable that the material have a high index of refraction, although there is no particular lower limit for this value. In general, the higher the index of refraction, the sharper the rod may be bent without losing light at the bend in air.

Although in the particular device shown in the drawing the portion of the rod that is to be immersed in the liquid is bent, this is not essential, although it is desirable. The effect described is apparent even though the liquid contacts a straight portion of the rod because most of the light transmitted through the rod consists of rays extending at random in various directions at small angles to the longitudinal axis of the rod (as shown in Fig. 4), and any rays impinging upon the surface where it is immersed in liquid will pass out of the rod unless the angle of incidence is very large and the index of refraction of the liquid is a great deal less than that of the rod material.

Although for purposes of explaining the invention certain relatively simple embodiments thereof have been described in detail, it will be understood by those skilled in the art that the invention is applicable to much more complicated apparatus, as, for instance, gauges in which light of constant value would be supplied at the end 7 of the rod and a photoelectric cell positioned at the end 8 to control an electrical indicator, relay or similar device. The invention is therefore to be limited only to the extent set forth in the appended claims.

I claim:

1. In combination, a receptacle adapted to contain liquid, a light-conductive rod of transparent material having two end portions exterior of said receptacle and having an intermediate portion within said receptacle, one of said end portions being exposed to light, which light is conducted along said rod to illuminate the other end to an extent varying with the light-conducting efficiency of said rod, at least a portion of said rod within said receptacle having its surface directly exposed to the receptacle contents whereby its internal reflection characteristics and hence its light-conducting efficiency, varies according to the refractive properties of the tank contents.

2. The combination as described in claim 1, in which said receptacle comprises a tank having an elongated filler neck with said rod extending through said filler neck substantially to the juncture of the neck and tank.

3. The combination as described in claim 1, in which said receptacle comprises a tank having an elongated curved filler neck with said rod extending through and curved to conform with said filler neck.

4. The combination as described in claim 1, in which said receptacle has a filler opening and the two end portions of said rod are positioned closely adjacent each other and adjacent said filler opening.

5. The combination as described in claim 1, in which said rod is discontinuous, consisting of sections, with each pair of adjacent sections having substantially parallel abutting faces through which light is transmitted through one section to the next.

6. A device for indicating the presence or absence of liquid, comprising an elongated light-conductive rod of transparent material having one end adapted to collect light for transmission longitudinally toward the other end, the other end of said rod being positioned for observation as to the amount of light reaching it from said one end, and an intermediate portion of said rod being subject to contact with the liquid to be tested for, said rod having substantially total internal reflection characteristics in gas and relatively poor internal reflection characteristics when the lateral surface thereof is contacted by liquid.

7. An attachment for liquid-containing tanks having elongated filler necks, said attachment comprising a fitting attachable to the end of said filler neck with a light-conductive rod anchored to said fitting, said rod being doubled back on itself and the two ends exposed to view adjacent said fitting, the intermediate portion of said rod being adapted to extend through said filler neck substantially to the juncture of the filler neck and tank, whereby rise of liquid in the tank to the filler neck thereof varies the light-transmission characteristics of said rod and the degree of illumination of at least one end of said rod.

8. An attachment as described in claim 7, in which said fitting comprises an extension neck attachable to the end of said filler neck, with the two ends of said rod extended through the wall of said extension neck to the exterior thereof, the end of said extension neck being adapted to receive a filler cap.

HENRY EWIN JORDAN.